(12) United States Patent
Chang et al.

(10) Patent No.: US 10,691,971 B2
(45) Date of Patent: Jun. 23, 2020

(54) METHOD AND APPARATUS FOR RECOGNIZING OBJECT

(71) Applicant: SAMSUNG ELECTRONICS CO., LTD., Suwon-si (KR)

(72) Inventors: Hyun Sung Chang, Seoul (KR); Donghoon Sagong, Suwon-si (KR); Minjung Son, Suwon-si (KR); Kyungboo Jung, Seoul (KR); Young Hun Sung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 15/492,772

(22) Filed: Apr. 20, 2017

(65) Prior Publication Data

US 2018/0150715 A1 May 31, 2018

(30) Foreign Application Priority Data

Nov. 28, 2016 (KR) .................. 10-2016-0159536

(51) Int. Cl.
*G06K 9/46* (2006.01)
*G06K 9/32* (2006.01)
*G06K 9/62* (2006.01)
*G06N 3/08* (2006.01)
*G06N 3/04* (2006.01)

(52) U.S. Cl.
CPC ......... *G06K 9/4609* (2013.01); *G06K 9/3233* (2013.01); *G06K 9/4628* (2013.01); *G06K 9/4671* (2013.01); *G06K 9/6267* (2013.01); *G06N 3/0454* (2013.01); *G06N 3/084* (2013.01)

(58) Field of Classification Search
CPC .................. G06K 9/4609; G06K 9/4671
See application file for complete search history.

(56) References Cited

U.S. PATENT DOCUMENTS

| 8,879,855 | B2 | 11/2014 | Angelova et al. |
| 9,190,053 | B2 | 11/2015 | Penn et al. |
| 2010/0124359 | A1* | 5/2010 | Vaidya ............... G06K 9/00771 382/103 |

(Continued)

FOREIGN PATENT DOCUMENTS

| EP | 3 035 246 A2 | 6/2016 |
| KR | 10-0903816 B1 | 6/2009 |

(Continued)

OTHER PUBLICATIONS

Branson, Steve, et al., "Bird Species Categorization Using Pose Normalized Deep Convolutional Nets", arXiv:1406.2952v1, Jun. 11, 2014 (14 pages in English).

(Continued)

*Primary Examiner* — Pinalben Patel
(74) *Attorney, Agent, or Firm* — NSIP Law

(57) ABSTRACT

A method includes actuating a processor to apply an input image to a feature extractor including a plurality of layers, determine a third feature vector based on first feature vectors of an input image output by a first layer included in a feature extractor and second feature vectors of the input image output by a second layer in the feature extractor, and identify an object in the input image based on the third feature vector.

30 Claims, 9 Drawing Sheets

(56) References Cited

U.S. PATENT DOCUMENTS

| | | | | |
|---|---|---|---|---|
| 2013/0094733 | A1* | 4/2013 | Nosato | G06K 9/4671 |
| | | | | 382/128 |
| 2013/0223683 | A1* | 8/2013 | Jiang | G06K 9/4638 |
| | | | | 382/103 |
| 2013/0315457 | A1* | 11/2013 | Beymer | G06T 7/0085 |
| | | | | 382/130 |
| 2014/0050391 | A1* | 2/2014 | Angelova | G06K 9/6267 |
| | | | | 382/159 |
| 2014/0288928 | A1* | 9/2014 | Penn | G10L 15/16 |
| | | | | 704/232 |
| 2016/0350592 | A1* | 12/2016 | Ma | G06K 9/4671 |
| 2017/0169315 | A1* | 6/2017 | Vaca Castano | G06K 9/3233 |
| 2017/0177972 | A1* | 6/2017 | Cricri | G06K 9/4671 |
| 2018/0039853 | A1* | 2/2018 | Liu | G06N 3/0454 |

FOREIGN PATENT DOCUMENTS

| | | |
|---|---|---|
| KR | 10-1254177 B1 | 4/2013 |
| KR | 10-1591626 B1 | 2/2016 |
| KR | 10-2016-0032536 A | 3/2016 |
| KR | 10-1624926 B1 | 5/2016 |
| KR | 10-2016-0061856 A | 6/2016 |
| KR | 10-2016-0069834 A | 6/2016 |
| KR | 10-2016-0088224 A | 7/2016 |
| KR | 10-1644998 B1 | 8/2016 |
| KR | 101914208 B1 * | 11/2018 |

OTHER PUBLICATIONS

Ma, Yukun, et al., "An Effective Face Verification Algorithm to Fuse Complete Features in Convolutional Neural Networks", *In: Multimedia Modeling, International Conference on Multimedia Modeling, Lecture Notes in Computer Science*, vol. 9517, Jan. 1, 2016 (8 pages in English).

Wei, Xiu-Shen, et al., "Mask—CNN: Localizing Parts and Selecting Descriptors for Fine-Grained Image Recognition" *Cornell University Library*, May 23, 2016.

Kong, Shu, et al., "Low-rank Bilinear Pooling for Fine-Grained Classification", XP055431155, Nov. 16, 2016 (pp. 4321-4330).

Extended European Search Report dated Dec. 11, 2017 in corresponding European Patent Application No. 17177468.0 (12 pages in English).

Gatys, Leon A., Alexander S. Ecker, and Matthias Bethge. "Image Style Transfer Using Convolutional Neural Networks." *Proceedings of the IEEE Conference on Computer Vision and Pattern Recognition*. 2016. (10 pages, in English).

Jaderberg, Max, Karen Simonyan, and Andrew Zisserman. "Spatial Transformer Networks." *Advances in Neural Information Processing Systems*. 2015. (9 pages, in English).

Lin, Tsung-Yu, et al. "Bilinear CNN Models for Fine-Grained Visual Recognition." *Proceedings of the IEEE International Conference on Computer Vision*. 2015. (9 pages, in English).

\* cited by examiner

METHOD AND APPARATUS FOR RECOGNIZING OBJECT

CROSS-REFERENCE TO RELATED APPLICATION(S)

This application claims the benefit under 35 USC § 119(a) of Korean Patent Application No. 10-2016-0159536 filed on Nov. 28, 2016, in the Korean Intellectual Property Office, the entire disclosure of which is incorporated herein by reference for all purposes.

BACKGROUND

1. Field

The following description relates to a method and apparatus for recognizing an object.

2. Description of Related Art

To solve an unknown problem, research on applying an approach (which employs certain similarities to human recognition) to a device is being conducted. For example, research on a method involving a neural network that models biological human nerve cells is being conducted. The neural network may use a selection of algorithms which may have emergent behavior appearing similar to a human learning ability. The neural network performs mapping between an input pattern and each of output patterns through learning. In addition, the neural network may have a generalization ability to generate a relatively correct, or good enough approximation output based on an input pattern not used for learning, based on a result of previous learning.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of recognizing an object includes actuating a processor to apply an input image to a feature extractor including a plurality of layers, determine a third feature vector based on first feature vectors of the input image output by a first layer included in the feature extractor and second feature vectors of the input image output by a second layer included in the feature extractor, and recognize the object in the input image based on the third feature vector.

The determining of the third feature vector may include determining the third feature vector by performing a pooling operation with respect to each of the first feature vectors and the second feature vectors.

The determining of the third feature vector may include obtaining a first pooled vector by performing a pooling operation with respect to each of the first feature vectors corresponding to results of a convolutional operation based on kernels of the first layer, obtaining a second pooled vector by performing the pooling operation with respect to each of the second feature vectors corresponding to results of the convolutional operation based on kernels of the second layer, and determining the third feature vector based on the first pooled vector and the second pooled vector.

The determining of the third feature vector further may include lightening the first pooled vector and the second pooled vector. The first pooled vector and the second pooled vector may be lightened based on a principal component analysis (PCA).

The obtaining of the first pooled vector may include obtaining the first pooled vector by performing the pooling operation based on the first feature vectors and a mask vector for passing an object corresponding to a target category. The method may further include applying the input image to an object separator, obtaining a mask image indicating a category of at least one object included in the input image, and obtaining the mask vector based on the mask image and a size of each of the first feature vectors.

The obtaining of the first pooled vector may include obtaining the first pooled vector by performing the pooling operation based on the first feature vectors and mask vectors for passing each target part of the object.

The determining of the third feature vector may include determining column vectors and row vectors based on corresponding points having a substantially identical offset in the first feature vectors, obtaining a plurality of vectors based on a product of the column vectors and the row vectors, determining a feature vector associated with the first layer based on a product of the vectors, and determining the third feature vector based on the feature vector associated with the first layer.

The recognizing of the object may include applying the third feature vector to a nonlinear classifier including a plurality of layers, and recognizing the object in the input image based on an output of the nonlinear classifier. The output of the nonlinear classifier may indicate a specific category corresponding to the object in the input image among specific categories included in a category.

A non-transitory computer-readable storage medium may store instructions, that when executed by the processor, cause the processor to perform the method.

In another general aspect, an object recognizing apparatus includes a processor, and a memory operably coupled to the processor including an instruction executable by the processor, wherein, in response to the instruction being executed by the processor, the processor is configured to apply an input image to a feature extractor including a plurality of layers, determine a third feature vector based on first feature vectors of the input image output by a first layer included in the feature extractor and second feature vectors of the input image output by a second layer included in the feature extractor, and identify the object in the input image based on the third feature vector.

The processor may be further configured to determine the third feature vector by performing a pooling operation with respect to each of the first feature vectors and the second feature vectors. The processor may be configured to obtain a first pooled vector by performing a pooling operation with respect to each of the first feature vectors, obtain a second pooled vector by performing the pooling operation with respect to each of the second feature vectors, and determine the third feature vector based on the first pooled vector and the second pooled vector.

The processor may be further configured to lighten the first pooled vector and the second pooled vector and determine the third feature vector based on the lightened first pooled vector and the second pooled vector. The processor may be configured to obtain the first pooled vector by performing the pooling operation based on the first feature vectors and a mask vector for passing an object corresponding to a target category. The processor may be configured to obtain the first pooled vector by performing the pooling operation based on the first feature vectors and mask vectors for passing each target part of the object.

The processor may be further configured to determine column vectors and row vectors based on corresponding points having a substantially identical offset in the first feature vectors, obtain a plurality of vectors based on a product of the column vectors and the row vectors, determine a feature vector associated with the first layer based on a product of the vectors, and determine the third feature vector based on the feature vector associated with the first layer.

The processor may be further configured to apply the third feature vector to a nonlinear classifier including a plurality of layers and recognize the object in the input image based on an output of the nonlinear classifier.

According to another general aspect, an object recognition apparatus includes a feature extractor comprising a neural-network, configured: to extract feature layers from an input image, to determine a third feature vector based on first feature vectors of the input image output by a first layer and second feature vectors of the input image output by a second layer, and a classifier operably coupled to the feature extractor and configured to identify an object in the input image based on the third feature vector.

The feature extractor may be further configured to determine the third feature vector by performing a pooling operation with respect to each of the first feature vectors and the second feature vectors.

The feature extractor may be further configured: to obtain a first pooled vector by performing a pooling operation with respect to each of the first feature vectors, to obtain a second pooled vector by performing the pooling operation with respect to each of the second feature vectors, and to determine the third feature vector based on the first vector and the second vector.

The feature extractor may be further configured to lighten the first pooled vector and the second pooled vector and determine the third feature vector based on the lightened first pooled vector and the second pooled vector.

The feature extractor may be further configured to obtain the first pooled vector by performing the pooling operation based on the first feature vectors and a mask vector for passing an object corresponding to a target category.

The feature extractor may be further configured to obtain the first pooled vector by performing the pooling operation based on the first feature vectors and mask vectors for passing each target part of the object.

Other features and aspects will be apparent from the following detailed description, the drawings, and the claims.

Figure 1:
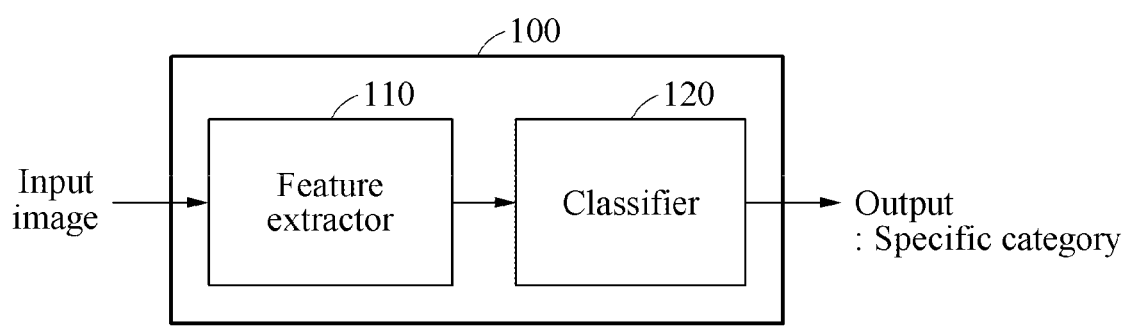
FIG. 1 illustrates an example of an object recognizing apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art after gaining a thorough understanding of the disclosure of this application. For example, the sequences of operations described herein are merely examples, and are not limited to those set forth herein, but may be changed as will be apparent to one of ordinary skill in the art after gaining such understanding of the disclosure of this application, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following specific structural or functional descriptions are exemplary to merely describe the examples, and the scope of the examples is not limited to the descriptions provided in the present specification.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, examples will be described in detail below with reference to the accompanying drawings, and like reference numerals refer to the like elements throughout.

FIG. 1 illustrates an example of an object recognizing apparatus. Referring to FIG. 1, an object recognizing apparatus 100 includes a feature extractor 110 and a classifier 120.

The object recognizing apparatus 100 applies an input image to the feature extractor 110 and recognizes a specific category of an object in the input image based on an output of the classifier 120. The object recognizing apparatus 100, is according to different embodiments provided in a hardware model, a firmware model, a software module, or a combination thereof.

The feature extractor 110 and the classifier 120, according to one or more embodiments, includes at least one neural network. The neural network may be used for deep learning. The deep learning is a machine learning scheme for solving a problem of image recognition or voice recognition from a big data set. The neural network includes a multi layer neural network including a plurality of layers. The multi layer neural network includes, in one or more embodiments, a fully connected neural network, a convolutional neural network, and a recurrent neural network. Feature layers are extracted from the multi layer neural network based supervised learning or unsupervised learning of deep learning.

The feature extractor 110 includes a plurality of layers. The layers output feature vectors from the input image. The feature extractor 110, according to one or more embodiments, includes a convolutional neural network. In this example, each of the layers of the feature extractor 110 output feature vectors corresponding to a number of kernels using the kernels. For example, a layer of the feature extractor 110 performs a convolutional operation by scanning the input image using a kernel and outputs a feature vector corresponding to a result of the convolutional operation. A feature of each of the kernels and a number of the kernels may be different for each layer of the feature extractor 110.

A size of the feature vector may be determined based on a size of the input image, a size of the kernel, and a scan method. The scan method, in an embodiment, includes a stride. The feature vector may be represented by a feature map. Feature vectors output by a layer may be represented in a form of a three-dimensional (3D) block in which feature maps overlap. For example, in response to a horizontal length of a feature map being represented by x, a vertical length of the feature map being represented by y, and a number of kernels being represented by z, the 3D block may be represented in an x-y-z space.

The object recognizing apparatus 100 performs a predetermined pooling operation with respect to each of the feature vectors output by the layers of the feature extractor 110. The predetermined pooling operation is, according to one or more embodiments, an operation differentiated from a pooling operation, for example, max pooling, used in the convolutional network. The feature vectors generated by performing the predetermined pooling operation include information for classifying the specific category. The object recognizing apparatus 100 transfers the feature vectors generated based on the predetermined pooling operation to the classifier 120.

The predetermined pooling operation is performed, according to one or more embodiments, in a manner corresponding to the layers included in the feature extractor 110 and the feature vectors obtained based on a result of the predetermined pooling operation are applied to the classifier 120. For example, a first layer included in the feature extractor 110 outputs first feature vectors and a second layer included in the feature extractor 110 outputs second feature vectors. The object recognizing apparatus 100 determines a third feature vector based on the predetermined pooling operation with respect to the first feature vectors and the predetermined pooling operation with respect to the second feature vectors, and applies the third feature vector to the classifier 120.

A classifier, heretofore provided, determines a type of an object in an input image. For example, the classifier determines whether an object in an input image is a dog or a cat. In this case, the classifier has a limited capacity to determine breed of dog. The classifier 120 determines a specific category corresponding to the object in the input image among specific categories included in a predetermined category based on a feature vector. For example, the predetermined category indicates a higher (or more abstract, general, e.g. a genus) type corresponding to the object in the input image and the specific category indicates a lower (more specific—e.g. a species) type corresponding to the object in the input image.

In an example, in response to the predetermined category being "bird", the specific category may include a specific breed of bird, for example, "sooty albatross", "black footed albatross", and "rhinoceros auklet". In another example, in response to the predetermined category being "flower", the specific category may include a specific type of flower, for example, "rose", "tulip", and "sunflower". In response to the predetermined category being "bag", the specific category may include a model of bag or a type of bag, for example, "back pack", "tote bag" and "cross bag".

The classifier 120 is, according to one or more embodiments, trained in advance to determine the specific category corresponding to the object in the input image. The classifier 120 is trained based on training data associated with the predetermined category. For example, the classifier 120 is trained to classify the specific breed of a bird based on training data associated with various breeds of birds.

A nonlinear relationship is established between a feature vector to be input to the classifier 120 and an output vector of the classifier 120 indicating the specific category. The classifier 120 includes a nonlinear classifier including a plurality of layers in order to obtain a solution of the nonlinear relationship. For example, the classifier 120 includes a fully connected neural network including a plurality of layers.

The classifier 120 determines the specific category corresponding to the object in the input image by performing nonlinear classification on the feature vector input to the classifier 120. For example, the classifier 120 outputs a vector indicating an output node corresponding to the specific category corresponding to the object in the input image among a predetermined number of output nodes corresponding to a predetermined number of specific categories.

The nonlinear classification of the classifier 120 involves a complex operation depending on a number of input nodes, a number of layers, and a number of output nodes. The number of layers in deep learning is beneficial in some embodiments for obtaining a solution to a nonlinear problem.

The object recognizing apparatus 100 lightens by intelligently selecting, paring, or trimming the output vector generated based on the predetermined pooling operation after performing the predetermined pooling operation on the feature vector output by the feature extractor 110. For example, the object recognizing apparatus 100 lightens the output vector generated based on the predetermined pooling operation based on a principal component analysis (PCA). In response to the output vector generated based on the predetermined pooling operation being lightened, the number of the input nodes of the classifier 120 decreases such that the classifier may secure an appropriate depth for nonlinearly classifying the specific category.

Figure 2:
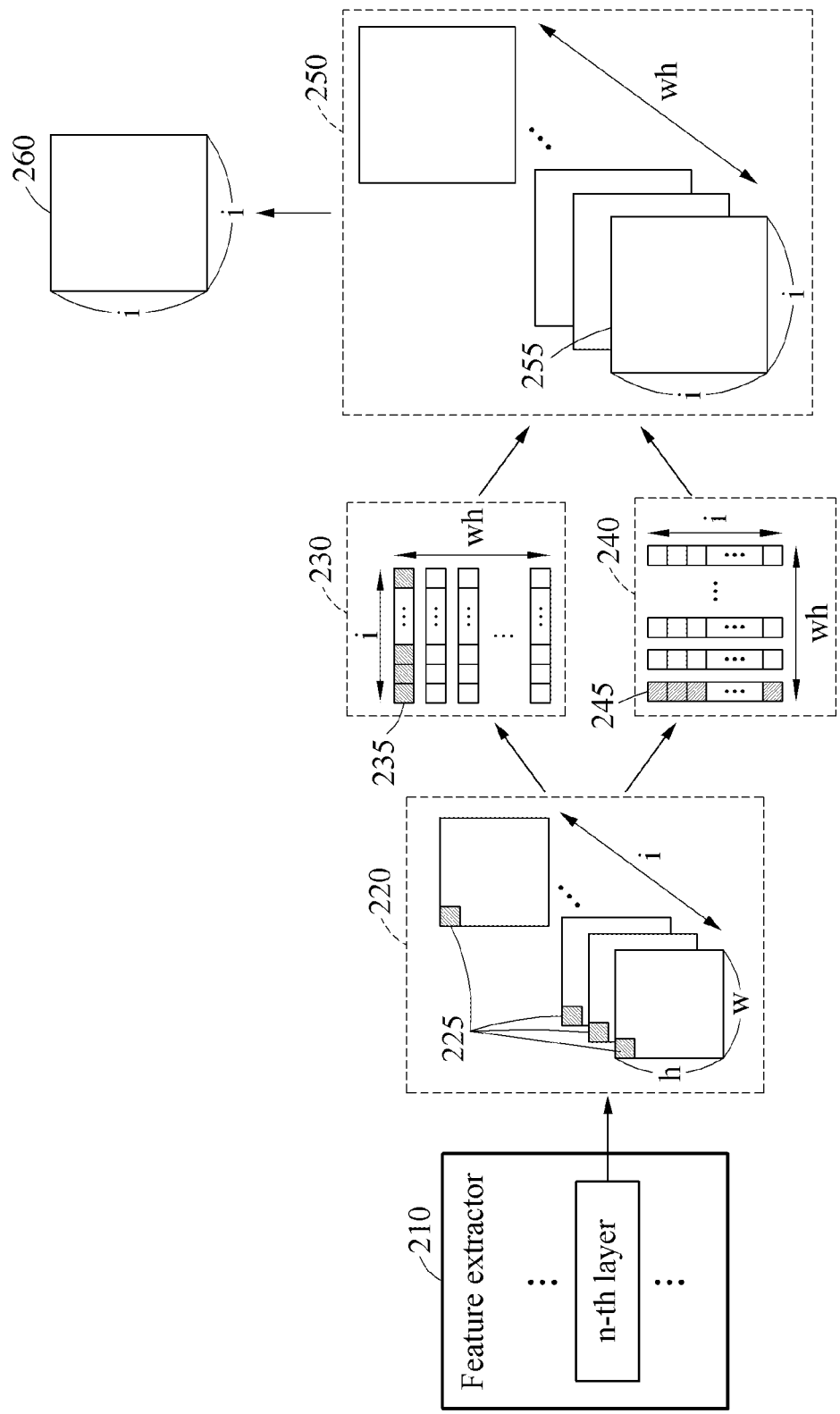
FIG. 2 illustrates an example of a pooling operation.

FIG. 2 illustrates an example of a predetermined pooling operation. Referring to FIG. 2, a feature extractor 210 includes a plurality of layers. A method of processing feature vectors output by an n-th layer among a plurality of layers included in the feature extractor 210 is explained below, but the explanation below is also applicable to other layers of the feature extractor 210.

The n-th layer outputs feature vectors 220. Although FIG. 2 illustrates that each of the feature vectors 220 is represented in a form of a two-dimensional (2D) map, the feature vectors 220 may be also represented in a one-dimensional vector. A number i of the feature vectors 220, in one or more embodiments, corresponds to a number of kernels used for the n-th layer. A length w and a length h indicate a size of each of the illustrated 2D feature vectors 220. The size of each of the feature vectors 220 is determined based on a size of an image input to the n-th layer, a size of a kernel, and a scan method. Here, in response to the n-th layer not being an input layer of the feature extractor 210, the size of the image input to the n-th layer may indicate a size of a feature vector output by an n−1-th layer.

An object recognizing apparatus, according to one or more embodiments, determines column vectors 230 and row vectors 240 based on corresponding points having a substantially identical offset in the first feature vectors 220. For example, the object recognizing apparatus determines a first column vector 235 and a first row vector 245 based on corresponding points 225 having an offset of (0, 0) in the feature vectors 220. A size n of each of the column vectors 230 and the row vectors 240 may correspond to a number i of the kernels used for the n-th layer. A number of the column vectors 230 and a number of the row vectors 240 are determined based on a size of a feature vector. For example, in response to the feature vector being represented in a 2D map, the number of the column vectors 230 and the number of the row vectors 240 are determined based on a product wh of the length w in an x-axial direction of the feature vector and the length h in a y-axial direction of the feature vector.

The object recognizing apparatus obtains vectors 250 based on a product of the row vectors 240 and the column vectors 230. For example, the object recognizing apparatus obtains a vector 255 based on a product of the first row vector 245 and the first column vector 235. A size of each of the vectors 250 may be determined to be i×i corresponding to the number i of the kernels used for the n-th layer. A number of the vectors 250 is determined to be wh based on the size of each of the feature vectors 220. The object recognizing apparatus determines a feature vector 260 associated with the n-th layer based on a sum of vectors.

The above-described predetermined pooling operation indicates an operation for determining the feature vector 260 based on the feature vectors 220 output corresponding to the kernels of the n-th layer. The predetermined pooling operation is, according to one or more embodiments, performed based on Equation 1.

$$f1_{ab} = \sum_{x,y} \alpha_{xya}\beta_{xyb} \qquad \text{[Equation 1]}$$

In Equation 1, f1 denotes a vector determined based on the predetermined pooling operation, α denotes a column vector for the predetermined pooling operation, and β denotes a row vector for the predetermined pooling operation.

FIG. 2 illustrates an example in which the feature vectors 220 of a single set output by the feature extractor 210 are used for the predetermined pooling operation. In this example, the column vector α and the row vector β are identical.

In another example, feature vectors of a plurality of sets output by a plurality of feature extractors are used for the predetermined pooling operation. For example, first feature vectors output by an n-th layer of a first feature extractor and second feature vectors output by an n-th layer of a second feature extractor are used for the predetermined pooling operation. In this example, the row vectors 240 are determined based on the first feature vectors and the column vectors 230 are determined based on the second feature vectors.

In Equation 1, a denotes an index of a kernel used for the n-th layer of the first feature extractor, and b denotes an index of a kernel used for the n-th layer of the second feature extractor. Here, a is (1≤a≤i) and b is (1≤a≤i). i denotes a number of kernels used for the n-th layer of the first feature extractor and j denotes a number of kernels used for the n-th layer of the second feature extractor. In response to a row vector and a column vector being generated based on an input vector output by a single object extractor, the number i and the number j may be identical. In addition, in Equation 1, each of x and y may correspond to coordinates of elements in an individual feature vector represented in a 2D map, and a combination of x and y may indicate an offset of the row vector and the column vector.

Figure 3:
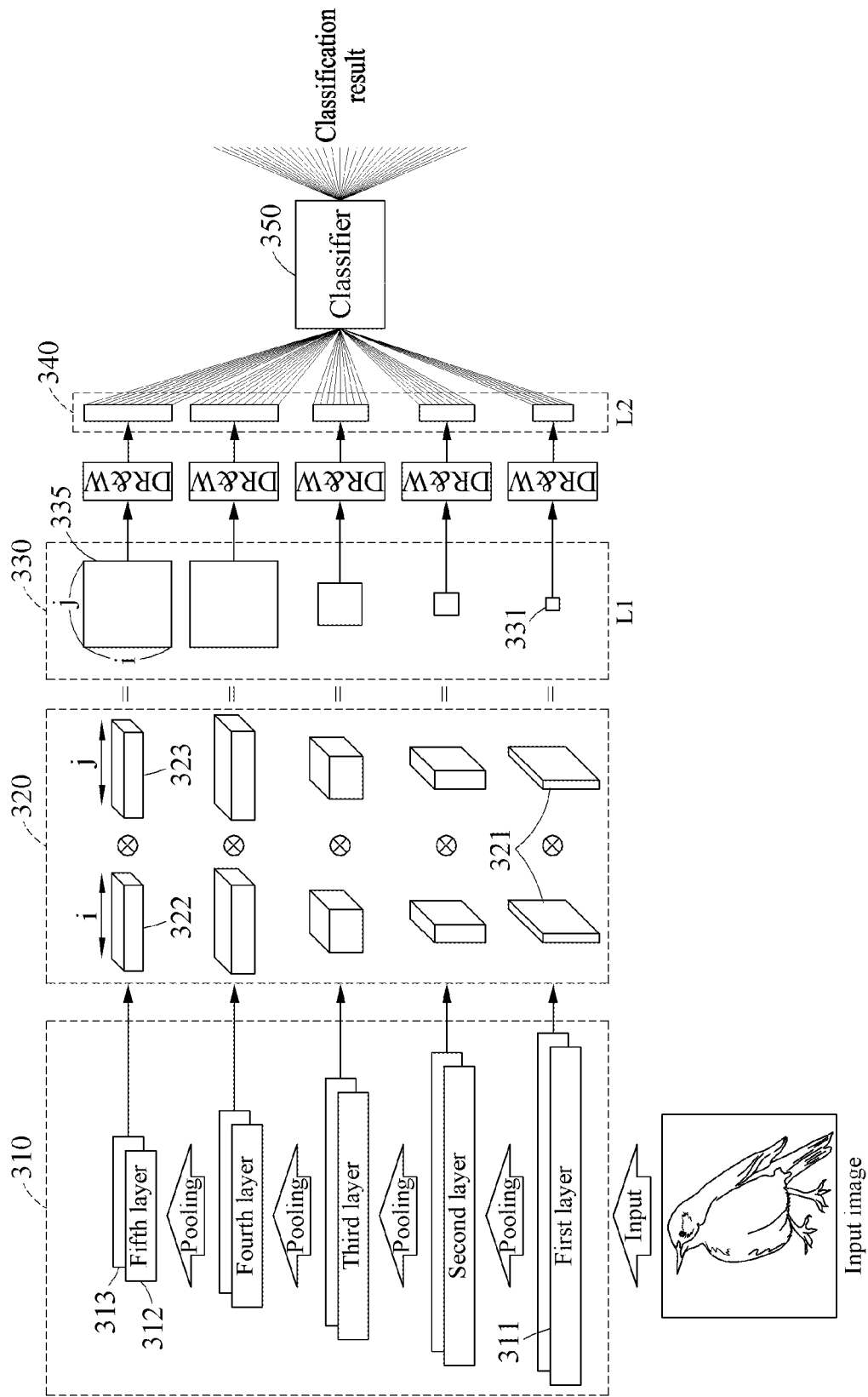
FIG. 3 illustrates an example of a process of recognizing an object.

FIG. 3 illustrates an example of a process of recognizing an object. Referring to FIG. 3, an object recognizing apparatus applies an input image to a feature extractor 310.

The feature extractor 310 includes a plurality of layers. Each of the layers of the feature extractor 310, according to one or more embodiments, output feature vectors. The feature vectors output by a single layer of the feature extractor 310 may be transferred to a next layer. In an example, max pooling is performed with respect to the feature vectors output by the single layer of the feature extractor 310 and then the feature vectors are transferred to the next layer.

The object recognizing apparatus obtains vectors 330 by performing a predetermined pooling operation based on the feature vectors output by the feature extractor 310. For example, the object recognizing apparatus generates a vector 331 associated with a first layer 311 by performing the predetermined pooling operation based on feature vectors 321 output by the first layer 311. The predetermined pooling operation is illustrated as being performed in block 320. Feature vectors represented in a two-dimensional (2D) map are represented in an overlapping form in the block 320. The predetermined pooling operation may be performed based on a left block and a right block based on a sign ⊗.

In an example, the feature extractor 310 includes a single neural network or two neural networks. In response to the feature extractor 310 including a first neural network and a second neural network, the predetermined pooling operation is performed based on feature vectors output by the first neural network and feature vectors output by the second neural network.

For example, the predetermined pooling operation is performed based on feature vectors 322 output by a fifth layer 312 of the first neural network and feature vectors 323 output by a fifth layer 313 of the second neural network. Also, a vector 335 is, according to one or more embodiments, generated based on the predetermined pooling operation performed based on the feature vectors 322 and the feature vectors 323. Here, a length i of the feature vectors 322 corresponds to a number of kernels used for the fifth layer 312, and a length j of the feature vectors 323 corresponds to a number of kernels used for the fifth layer 313. A size of each of the kernels used for the fifth layer 312 and a size of each of the kernels used for the fifth layer 313 may be identical.

The object recognizing apparatus generates a feature vector 340 by lightening the vectors 330. The object recognizing apparatus minimizes a loss of information included in each of the vectors 330 and lightens the vectors 330. For example, the object recognizing apparatus lightens the vectors 330 based on a principal component analysis (PCA). A size or a dimension of the lightened vectors is beneficially reduced compared to a size or a dimension of the vectors 330. Lightening may be performed in a dimension reduction & whitening (DR&W) block.

The object recognizing apparatus, according to one or more embodiments, determines the feature vector 340 used as an input of a classifier 350 based on the lightened vectors. For example, the object recognizing apparatus generates the feature vector 340 by performing concatenation on the lightened vectors. In response to the vectors 330 being lightened, a size L2 of the feature vector 340 is, generally, smaller than a total size L1 of the vectors 330.

The object recognizing apparatus, according to one or more embodiments, applies the feature vector 340 to the classifier 350. The classifier 350 performs nonlinear classification based on the feature vector 340. For example, a result of classification of the classifier 350 indicates a specific category of a bird included in the input image.

Figure 4:
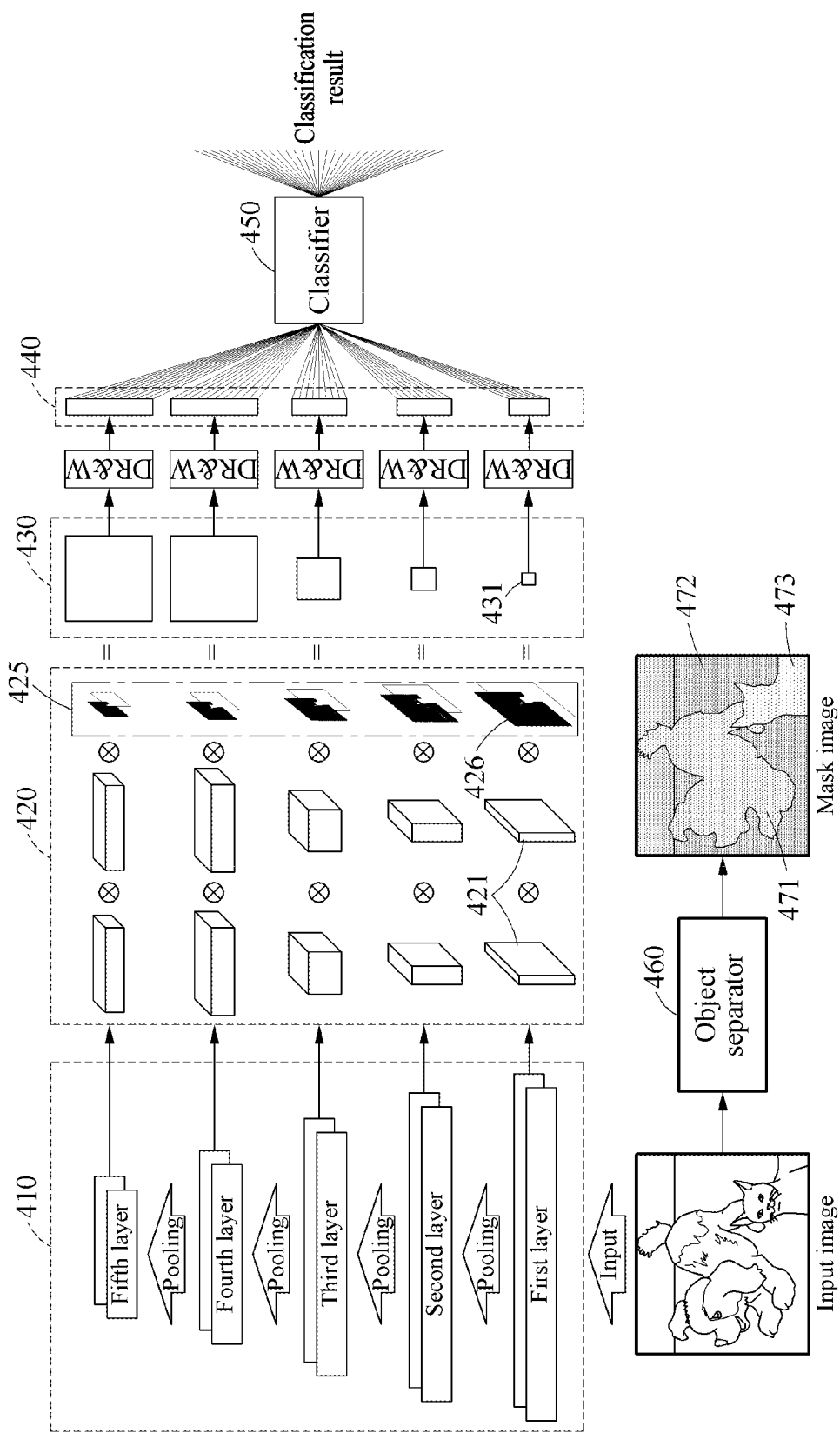
FIG. 4 illustrates an example of a process of recognizing an object using a mask vector.

FIG. 4 illustrates an example of a process of recognizing an object using a mask vector. Referring to FIG. 4, an object recognizing apparatus applies an input image to a feature extractor 410 and an object separator 460.

The object recognizing apparatus obtains vectors 430 by performing a predetermined pooling operation based on mask vectors 425 and feature vectors output by the feature extractor 410. For example, the object recognizing apparatus obtains a vector 431 associated with a first layer by performing the predetermined pooling operation based on feature vectors 421 output by the first layer and a mask vector 426.

A mask vector, according to one or more embodiments, passes an object corresponding to a target category corresponding to a classifier 450 among objects included in the input image. For example, in response to the classifier 450 classifying a specific type of a cat included in the input image, the object recognizing apparatus generates a mask vector for passing (or excluding) an object corresponding to the cat in the input image. In response to the classifier 450 classifying a specific type of a dog included in the input image, the object recognizing apparatus generates a mask vector for passing an object corresponding to the dog in the input image.

The object separator 460, according to one or more embodiments, outputs a mask image indicating a category of at least one object included in the input image. For example, the input image includes a dog, a cat and a sofa. The object separator 460 analyzes objects included in the input image and outputs a mask image that separates the dog, the cat, and the sofa based on a result of analysis. The mask image includes an area 471 corresponding to the dog in the input image, an area 472 corresponding to the sofa in the input image, and an area 473 corresponding to the cat in the input image. The object separator 460 includes a multi layer neural network or may be trained in advance to separate the objects included in the input image.

The object recognizing apparatus, according to one or more embodiments, selects the area corresponding to the target category of the classifier 450 from the mask image. For example, in response to the classifier 450 classifying a specific type of the cat included in the image, the object recognizing apparatus selects the area 473 corresponding to the cat. The object recognizing apparatus may, for example, generate the mask vector by filling a selected area with "1" and filling remaining areas with "0" or vice versa. The object recognizing apparatus adjusts a size of the mask vector based on a size of each of feature vectors of a block 420. For example, the object recognizing apparatus generates the mask vector 426 corresponding to the size of each of the feature vectors 421.

Figure 5:
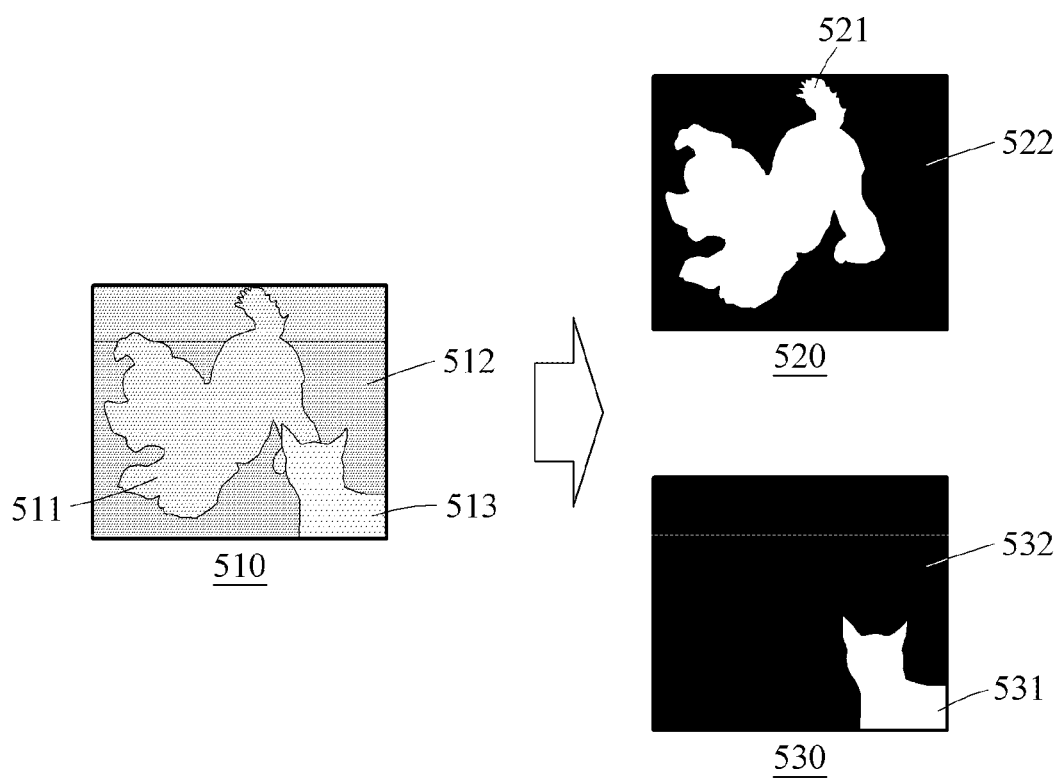
FIG. 5 illustrates an example of a process of generating a mask vector.

Additional description of the mask vector is provided with reference to FIG. 5. FIG. 5 illustrates an example of a process of generating a mask vector. Referring to FIGS. 4 and 5, the object recognizing apparatus selects at least one area from a mask image 510 based on a target category classified by the classifier 450. For example, the object recognizing apparatus selects at least one area from an area 511 corresponding to the dog, an area 512 corresponding to the sofa, and an area 513 corresponding to the cat from the mask image 510.

In response to the target category classified by the classifier 450 corresponding to "dog", the object recognizing apparatus selects the area 511 corresponding to the dog and generates a mask vector 520. In the mask vector 520, an area 521, for example, is filled with "1" and an area 522 may be filled with "0". The object recognizing apparatus may adjust a size of the mask vector 520 corresponding to a size of each of feature vectors output by a feature extractor.

Alternatively, in response to the target category classified by the classifier 450 corresponding to "cat", the object recognizing apparatus selects the area 513 corresponding to the cat and generates a mask vector 530. In the mask vector 530, an area 531 may be filled with "1" and an area 532 may be filled with "0". The object recognizing apparatus adjusts a size of the mask vector 530 corresponding to the size of each of the feature vectors output by the feature extractor.

Referring back to FIG. 4, the object recognizing apparatus, according to an embodiment, determines the vectors 430 by performing the predetermined pooling operation based on the feature vectors output by the feature extractor 410 and the mask vectors 425. Here, the predetermined pooling operation is performed, for example, in the block 420 based on Equation 2.

$$f2_{ab} = \sum_{x,y} \alpha_{xya} \beta_{xyb} \gamma_{xy} \quad \text{[Equation 2]}$$

In Equation 2, f2 denotes a vector determined based on the predetermined pooling operation, α denotes a column vector for the predetermined pooling operation, β denotes a row vector for the predetermined pooling operation, and γ denotes a mask vector. Also, in Equation 2, each of a and b denotes an index of a kernel, and each of x and y denotes coordinates of elements in an individual feature vector represented in a two-dimensional (2D) map. Here, a is ($1 \le a \le i$) and b is ($1 \le b \le j$). As described above, the feature extractor 410, according to an embodiment, includes a first feature extractor and a second feature extractor. In this example, i denotes a number of kernels used for an n-th layer of the first feature extractor and j denotes a number of kernels used for an n-th layer of the second feature extractor. Because a size of a mask vector is adjusted corresponding to a size of each of feature vectors, offsets of a column vector, a row vector, and a mask vector are calculated based on identical coordinates.

The object recognizing apparatus generates a feature vector 440 by lightening the vectors 430. Lightening is performed, according to an embodiment, in a dimension reduction & whitening (DR&W) block. The object recognizing apparatus applies the feature vector 440 to the classifier 450. The classifier 450 performs nonlinear classification based on the feature vector 440. For example, in response to a target category of the classifier 450 corresponding to "cat" and the area 473 being selected from the mask image, a result of classification of the classifier 450 indicates a specific category of the cat. Because only information on the target category of the classifier 450 remains in the feature vectors output by the feature extractor 410 based on the mask vectors 425, an accuracy in recognizing a specific category is beneficially enhanced.

Figure 6:
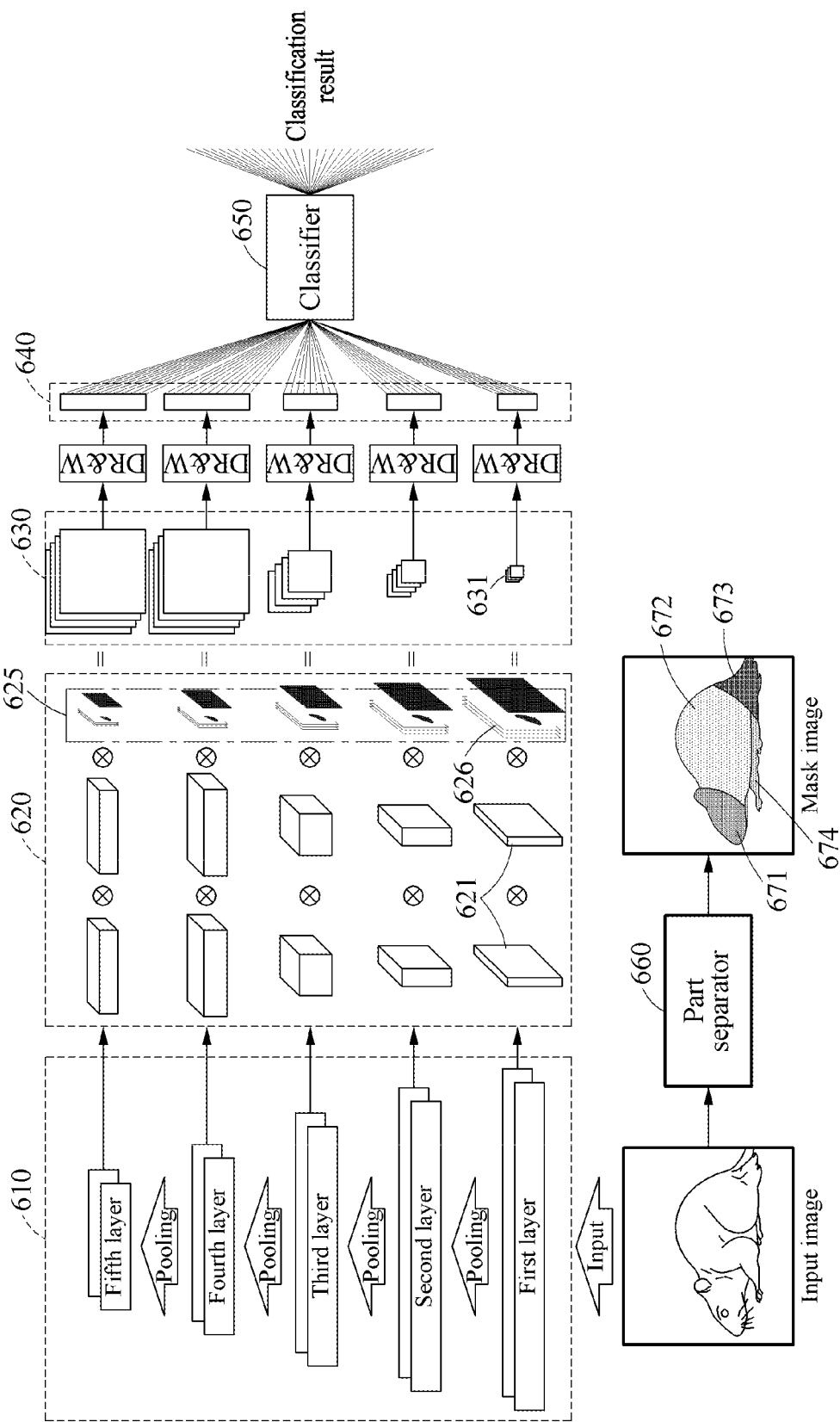
FIG. 6 illustrates another example of a process of recognizing an object using a mask vector.

FIG. 6 illustrates another example of a process of recognizing an object using a mask vector. Referring to FIG. 6, an object recognizing apparatus applies an input image to a feature extractor 610 and a part separator 660.

The object recognizing apparatus, according to one or more embodiments, obtains vectors 630 by performing a predetermined pooling operation based on mask vectors 625 and feature vectors output by the feature extractor 610. For example, the object recognizing apparatus obtains vectors 631 associated with a first layer by performing the predetermined pooling operation based on feature vectors 621 output by the first layer and mask vectors 626.

The part separator 660 outputs a mask image indicating at least one part of an object included in the input image. For example, the input image includes a mouse. The part separator 660 analyzes the object included in the input image and outputs the mask image based on a result of analysis. The mask image, in this example, includes an area 671 corresponding to a head of the mouse, an area 672 corresponding to a torso of the mouse, an area 673 corresponding to a tail of the mouse, and an area 674 corresponding to a leg of the mouse. The part separator 660, in one or more embodiments, includes a multi layer neural network and may be trained in advance to separate parts of the object included in the input image.

At least one part indicated by the mask image may be determined in advance for each category. For example, in response to a target category of a classifier 650 being "mouse", parts indicated by the mask image include the head, torso, tail, and leg. In another example, in response to the target category of the classifier 650 being "bird", parts indicated by a mask image include a head, beak, torso, and wing. In response to the target category of the classifier 650 being "bag", parts indicated by a mask image include a main body and strap.

The mask vector may pass target parts of the object allocated to the mask vector. For example, the mask vectors 626 include a mask vector for passing the head of the mouse, a mask vector for passing the torso of the mouse, a mask vector for passing the tail of the mouse, and a mask vector for passing the leg of the mouse while excluding other portions. The object recognizing apparatus, according to one or more embodiments, generates a mask vector by filling an area corresponding to a target part with "1" and filling remaining areas with "0". The object recognizing apparatus determines a size of the mask vector based on a size of each of feature vectors 620. For example, the object recognizing apparatus generates the mask vectors 626 corresponding to the size of each of the feature vectors 621.

Figure 7:
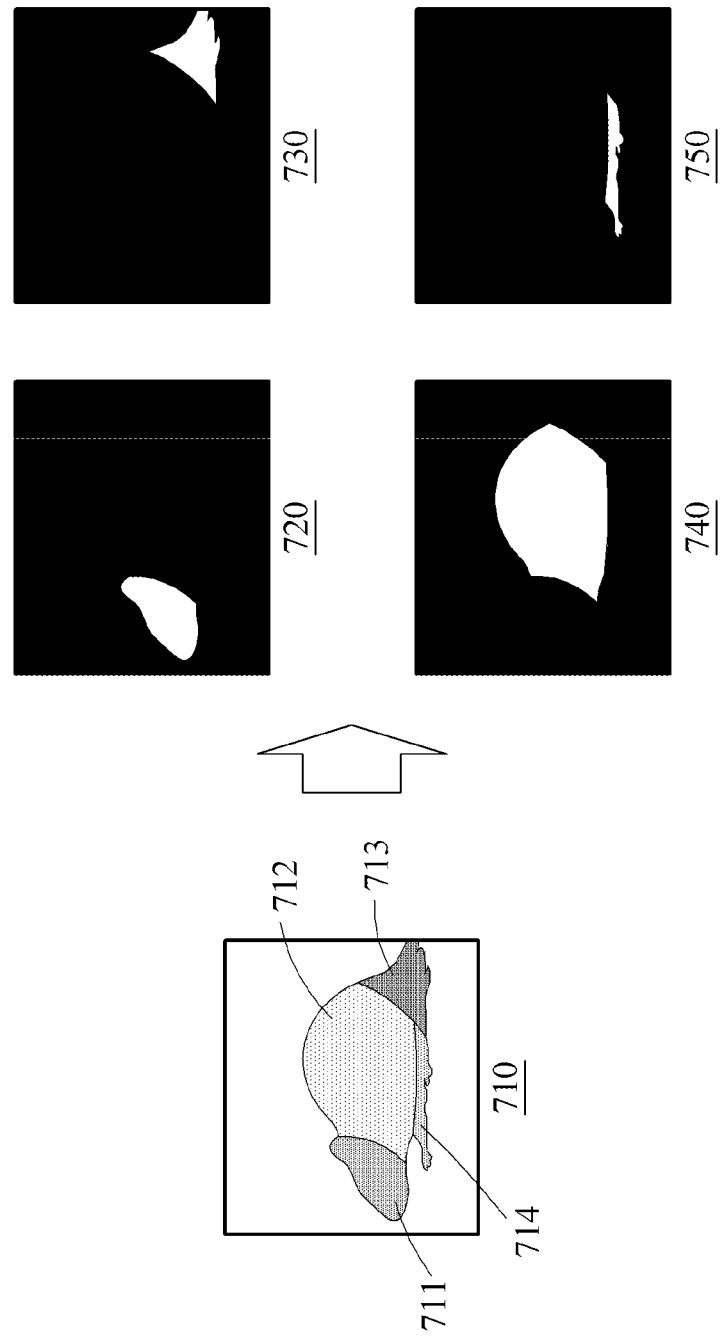
FIG. 7 illustrates another example of a process of generating a mask vector.

Additional description of the mask vector is provided with reference to FIG. 7. FIG. 7 illustrates another example of a process of generating a mask vector. Referring to FIG. 7, the object recognizing apparatus generates mask vectors 720 through 750 based on a mask image 710. For example, the mask vector 720 may pass the head of the mouse, the mask vector 730 may pass the tail of the mouse, the mask vector 740 may pass the torso of the mouse, and the mask vector 750 may pass the leg of the mouse. In each of the mask vectors 720 through 750, a target area may be filled with "1" and remaining areas with "0". The object recognizing apparatus may adjust a size of the mask vector 720 corresponding to a size of each of feature vectors output by a feature extractor. Other suitable measures for passing the mask vector according to certain parts will be apparent to one of skill in the art after gaining a thorough understanding of the detailed description and FIGS.

Referring back to FIG. 6, the object recognizing apparatus, according to the embodiment, determines the vectors 630 by performing the predetermined pooling operation based on the mask vectors 625 and the feature vectors output by the feature extractor 610. On each of layers of the feature extractor 610, a number of vectors may correspond to a number of mask vectors. For example, a number of the vectors 631 corresponds to a number of the mask vectors 626. The predetermined pooling operation may be performed in the block 620 based on Equation 3.

$$f3_{abk} = \sum_{x,y} \alpha_{xya} \beta_{xyb} \gamma_{xyc} \qquad \text{[Equation 3]}$$

In Equation 3, f3 denotes a vector determined based on the predetermined pooling operation, α denotes a column vector for the predetermined pooling operation, β denotes a row vector for the predetermined pooling operation, and γ denotes a mask vector. Also, in Equation 3, each of a and b denotes an index of a kernel, c denotes an index of a mask vector, and each of x and y denotes coordinates of elements in an individual feature vector represented in a two-dimensional (2D) map. Here, a is ($1 \le a \le i$), b is ($1 \le b \le j$), and c is ($1 \le c \le k$). As described above, the feature extractor 610, according to embodiment, includes a first feature extractor and a second feature extractor. In this example, i denotes a number of kernels used for an n-th layer of the first feature extractor and j denotes a number of kernels used for an n-th layer of the second feature extractor. k denotes a number of mask vectors. Because a size of a mask vector is adjusted corresponding to a size of each of the feature vectors, offsets of a column vector, a row vector, and the mask vector may be calculated based on coordinates.

The object recognizing apparatus generates a feature vector 640 by lightening the vectors 630. Lightening may be performed in a dimension reduction & whitening (DR&W)

block. The object recognizing apparatus applies the feature vector 640 to the classifier 650. The classifier 650 performs nonlinear classification based on the feature vector 640. For example, a result of classification of the classifier 650 indicates a specific category of the mouse included in the input image. The classifier 650 may be trained in advance to classify the specific category of the input image based on a feature vector including information that is classified for each target part. Because the feature vectors output by the feature extractor 610 based on the mask vectors 625 include information classified for each target part and the feature vectors are transferred to the classifier 650, an accuracy in recognizing the specific category is significantly enhanced.

Figure 8:
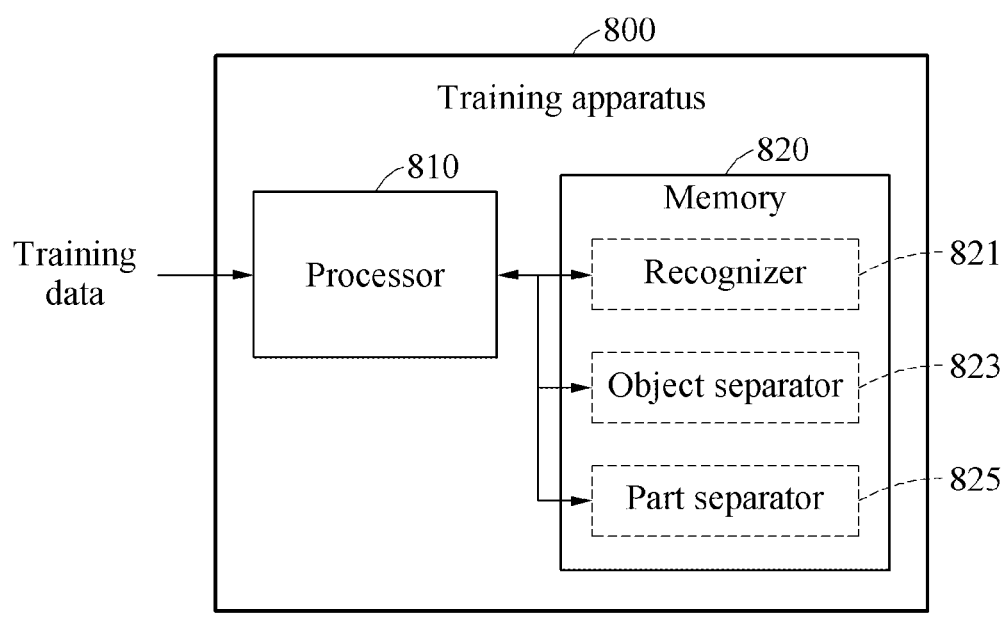
FIG. 8 is a block diagram illustrating an example of a training apparatus.

FIG. 8 is a block diagram illustrating an example of a training apparatus. Referring to FIG. 8, a training apparatus 800 includes a processor 810 operably coupled to a memory 820 such as by a system bus.

The processor 810 trains a recognizer 821, an object separator 823, and a part separator 825 based on training data—while the recognizer 821, object separator 823, and part separator 825 are shown as being contained within memory in this embodiment, in other embodiments, they are composed of other functional hardware and firmware components. The recognizer 821, in one or more embodiments, includes the feature extractor 110 and/or the classifier 120 of FIG. 1. The training data includes a training input and a training output. The training output is mapped to the training input. For example, the training output indicates a label to be output from the training input.

The processor 810 trains the recognizer 821, the object separator 823, and the part separator 825 such that the training output is calculated based on the training input. For example, the processor trains the recognizer 821 to determine a specific category corresponding to an object in the training input. In this example, the training input may include an image in which objects included in a target category are represented.

The recognizer 821, the object separator 823, and the part separator 825, according to one or more embodiments, includes at least one neural network. In an example, the processor 810 learns a connection weight between layers of the neural network through error back propagation learning. For example, the processor 810 trains the neural network through supervised learning.

The supervised learning is a method of updating the connection weight such that the training input and the training output corresponding to the training input are input to the neural network and the training output corresponding to the training input is output. For example, the processor 810 updates a connection weight between neurons through a delta rule or error back propagation learning.

The error back propagation learning is a method of adjusting the connection weight by estimating an error based on forward computation with respect to the provided training data, propagating the estimated error in a reverse direction starting from an output layer to a hidden layer and an input layer, and thereby reducing the error. The neural network may be recognized in an order of the input layer, the hidden layer, and the output layer, but the connection weight may be updated in an order of the output layer, the hidden layer, and the input layer when the error back propagation learning is used.

The memory 820 includes the recognizer 821, the object separator 823, and the part separator 825. The memory 820 stores the neural network that is sequentially updated during a training process. Also, the memory 820 stores the training data.

Figure 9:
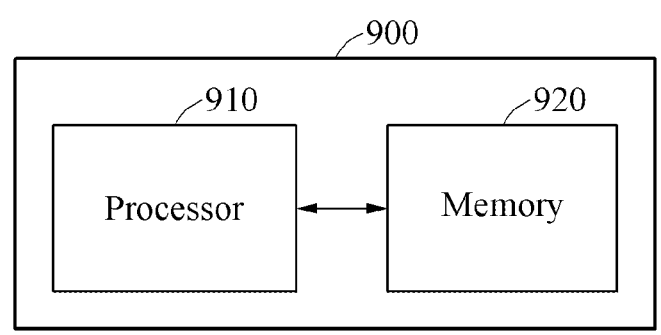
FIG. 9 is a block diagram illustrating an example of an object recognizing apparatus.

FIG. 9 is a block diagram illustrating an example of an object recognizing apparatus. Referring to FIG. 9, an object recognizing apparatus 900 includes a processor 910 which is operably coupled to a memory 920 which may include local memory such as ram or non-volatile storage and/or remotely accessible memory such as cloud storage or network attached storage (NAS).

The processor 910 may include at least one of above-described recognizer 821, object separator 823, and part separator 825, and/or perform at least one of above-described methods. For example, the processor 910 processes the above-described operation associated with object recognition. In more detail, the processor 910 applies an input image to a feature extractor including a plurality of layers, determines a third feature vector based on first feature vectors of the input image output by a first layer included in the feature extractor and second feature vectors of the input image output by a second layer included in the feature extractor, and recognizes an object in the input image based on the third feature vector.

The memory 920 stores instructions readable by a computer. In response to the instructions stored in the memory 920 being executed, the processor 910 performs an operation associated with object recognition. In addition, the memory 920 stores at least one of the above-described recognizer 821, object separator 823, and part separator 825 and pieces of data associated with object recognition. For example, the memory 920 stores equations for a predetermined pooling operation, a recognizer, an object separator, a part separator, a feature vector, and a mask vector.

The processor 910 executes instructions, scripts, and/or programs. The processor 910, in one or more embodiments, controls the object recognizing apparatus 900. The object recognizing apparatus 900 is connected to an external device, for example, a personal computer (PC) or a network, via an input/output device (not shown), to exchange data with the external device. For example, the object recognizing apparatus 900 receives an input image through a camera. The object recognizing apparatus 900 may be implemented in at least a portion of, for example, a mobile device, for example, a mobile telephone, a smartphone, a personal digital assistant (PDA), a tablet computer or a laptop computer, a computing device, for example, a PC, a tablet computer or a netbook computer, an electronic product, for example, a television (TV), a smart TV, a smart-car, a robot, scientific instruments, a microwave, refrigerator, oven, or other kitchen appliance, or a security device for gate control. Repeated descriptions will be omitted for increased clarity and conciseness because the above-described descriptions are applicable to the object recognizing apparatus 900.

Figure 10:
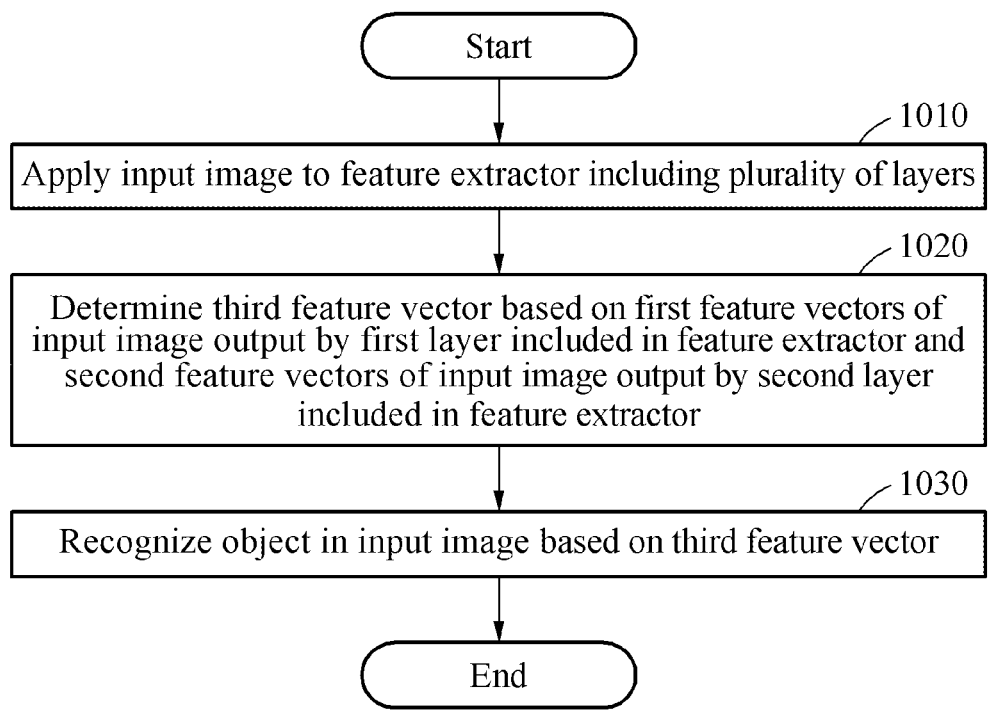
FIG. 10 is a flowchart illustrating an example of a method of recognizing an object.

FIG. 10 is a flowchart illustrating an example of a method of recognizing an object. Referring to FIG. 10, in operation 1010, an object recognizing apparatus applies an input image to a feature extractor including a plurality of layers. In operation 1020, the object recognizing apparatus determines a third feature vector based on first feature vectors of the input image output by a first layer included in the feature extractor and second feature vectors of the input image output by a second layer included in the feature extractor. In operation 1030, the object recognizing apparatus recognizes an object in the input image based on the third feature vector. Repeated descriptions will be omitted for increased clarity and conciseness because descriptions provided with reference to FIGS. 1 through 9 are also applicable to each of operations of FIG. 10.

The recognizer 821, object separator 823, part separator 825, classifier 120, feature extractor 110, DR&W units in FIGS. 1, 3-6, 8, and 9, that perform the operations described in this application are implemented by hardware components configured to perform the operations described in this application.

Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 and 10 that perform the operations described in this application are performed by computing hardware, for example, by one or more processors or computers, implemented as described above executing instructions, firmware, or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above after gaining a thorough understanding of the subject detailed description and FIGS.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art, after gaining a thorough understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of recognizing an object, the method comprising:
applying an input image to a feature extractor including a plurality of layers;
extracting first feature vectors from the input image by one or more first layers of the feature extractor;
extracting second feature vectors from pooling results with respect to the extracted first feature vector by one or more second layers of the feature extractor;

determining a third feature vector based on the extracted
first feature vectors and the extracted second feature
vectors; and
identifying the object in the input image based on the third
feature vector,
wherein the determining of the third feature vector comprises:
determining first sub-vectors and second sub-vectors
based on corresponding values having a substantially
identical offset in the extracted first feature vectors;
obtaining a feature vector associated with the first layer
based on operations using the first sub-vectors and
second the sub-vectors; and
determining the third feature vector based on the feature vector associated with the first layer.

2. The method of claim 1, wherein the determining of the third feature vector comprises determining the third feature vector by performing a pooling operation with respect to each of the first feature vectors and the second feature vectors.

3. The method of claim 1, wherein the determining of the third feature vector further comprises:
obtaining a first pooled vector by performing a pooling operation with respect to each of the first feature vectors corresponding to results of a convolutional operation based on kernels by a convolutional layer of the one or more first layers;
obtaining a second pooled vector by performing a pooling operation with respect to each of the second feature vectors corresponding to results of a convolutional operation based on other kernels by a convolutional layer of the one or more second layers; and
determining the third feature vector based on the first pooled vector and the second pooled vector.

4. The method of claim 3, wherein the determining of the third feature vector further comprises lightening the first pooled vector and the second pooled vector.

5. The method of claim 4, wherein the first pooled vector and the second pooled vector are lightened based on a principal component analysis (PCA).

6. The method of claim 3, wherein the obtaining of the first pooled vector comprises obtaining the first pooled vector by performing the pooling operation with respect to each of the first feature vectors based on the first feature vectors and a mask vector for passing an object corresponding to a target category.

7. A processor-implemented method of recognizing an object, the method comprising:
applying an input image to an object separator;
obtaining a mask image indicating a category of at least one object included in the input image;
obtaining a mask vector based on the mask image;
applying the input image to a feature extractor including a plurality of layers; and
determining a third feature vector based on a first pooled feature vector of first feature vectors of the input image output by a first layer included in the feature extractor and a second pooled feature vector of second feature vectors of the input image output by a second layer included in the feature extractor,
wherein the first pooled feature vector is a result of pooling based on the first feature vectors and the mask vector.

8. The method of claim 3, wherein the obtaining of the first pooled vector comprises obtaining the first pooled vector by performing the pooling operation with respect to each of the first feature vectors based on the first feature vectors and mask vectors for passing each target part of the object.

9. A processor implemented method of recognizing an object, the method comprising:
applying an input image to a feature extractor including a plurality of layers;
determining a third feature vector based on first feature vectors of the input image output by a first layer included in the feature extractor and second feature vectors of the input image output by a second layer included in the feature extractor; and
identifying the object in the input image based on the third feature vector,
wherein the determining of the third feature vector comprises:
determining column vectors and row vectors based on corresponding points having a substantially identical offset in the first feature vectors;
obtaining a plurality of vectors based on respective products of the column vectors and the row vectors;
determining a feature vector associated with the first layer based on the obtained plurality of vectors; and
determining the third feature vector based on the feature vector associated with the first layer.

10. The method of claim 1, wherein the recognizing of the object comprises:
applying the third feature vector to a nonlinear classifier including a plurality of layers; and
recognizing the object in the input image based on an output of the nonlinear classifier.

11. The method of claim 10, wherein the output of the nonlinear classifier indicates a specific category corresponding to the object in the input image among specific categories included in a predetermined category.

12. A non-transitory computer-readable storage medium storing instructions, that, when executed by the processor, cause the processor to perform the method of claim 1.

13. An object recognizing apparatus comprising:
a processor; and
a memory comprising an instruction executable by the processor, wherein, in response to the instruction being executed by the processor, the processor is configured to:
apply an input image to a feature extractor comprising a plurality of layers;
extract first feature vectors from the input image by one or more first layers of the feature extractor;
extract second feature vectors from pooling results with respect to the extracted first feature vector by one or more second layers of the feature extractor;
determine a third feature vector based on the extracted first feature vectors and the extracted second feature vectors; and
identify the object in the input image based on the third feature vector,
wherein, in response to the instruction being executed by the processor, the processor is further configured to:
determine first sub-vectors and second sub-vectors based on corresponding values having a substantially identical offset in the extracted first feature vectors;
obtain a feature vector associated with the first layer based on operations using the first sub-vectors and second the sub-vectors; and
determine the third feature vector based on the feature vector associated with the first layer.

14. The object recognizing apparatus of claim 13, wherein, in response to the instruction being executed by the processor, the processor is further configured to determine the third feature vector by performing a pooling operation with respect to each of the first feature vectors and the second feature vectors.

15. The object recognizing apparatus of claim 13, wherein, in response to the instruction being executed by the processor, the processor is further configured:
to obtain a first pooled vector by performing a pooling operation with respect to each of the first feature vectors,
to obtain a second pooled vector by performing the pooling operation with respect to each of the second feature vectors, and
to determine the third feature vector based on the first pooled vector and the second pooled vector.

16. The object recognizing apparatus of claim 15, wherein, in response to the instruction being executed by the processor, the processor is further configured to lighten the first pooled vector and the second pooled vector and to determine the third feature vector based on the lightened first pooled vector and the second pooled vector.

17. The object recognizing apparatus of claim 15, wherein, in response to the instruction being executed by the processor, the processor is further configured to obtain the first pooled vector by performing the pooling operation based on the first feature vectors and a mask vector for passing the object corresponding to a target category.

18. The object recognizing apparatus of claim 15, wherein, in response to the instruction being executed by the processor, the processor is further configured to obtain the first pooled vector by performing the pooling operation based on the first feature vectors and mask vectors for passing each target part of the object.

19. The object recognizing apparatus of claim 15, wherein, in response to the instruction being executed by the processor, the processor is further configured:
to determine column vectors and row vectors based on corresponding points having a substantially identical offset in the first feature vectors,
to obtain a plurality of vectors based on respective products of the column vectors and the row vectors,
to determine a feature vector associated with the first layer based on the obtained plurality of products, and
to determine the third feature vector based on the feature vector associated with the first layer.

20. The object recognizing apparatus of claim 13, wherein, in response to the instruction being executed by the processor, the processor is further configured to apply the third feature vector to a nonlinear classifier including a plurality of layers and recognize the object in the input image based on an output of the nonlinear classifier.

21. An object recognition apparatus, comprising:
a processor configured to implement a feature extractor comprising a neural-network and implement a classifier to identify an object in an input image,
wherein the feature extractor is configured to:
perform a first feature extraction of the input image;
generate a first vector with respect to each of first feature vectors dependent on the performed first feature extraction of the input image,
perform a second feature extraction of pooling results with respect to the first feature vectors;
generate a second vector with respect to each of second feature vectors dependent on the performed second feature extraction of the pooling results, and
determine a third feature vector based on the first vector and the second vector, and
wherein the classifier is configured to identify the object in the input image based on the third feature vector, and
wherein the feature extractor is further configured to:
determine first sub-vectors and second sub-vectors based on corresponding values having a substantially identical offset in the extracted first feature vectors;
obtain a feature vector associated with the first layer based on operations using the first sub-vectors and second the sub-vectors; and
determine the third feature vector based on the feature vector associated with the first layer.

22. The object recognizing apparatus of claim 21, wherein the performing of the feature extraction of the input image includes performing a first feature extraction by a first feature extractor layer to generate the first feature vectors and performing a second feature extraction by a second feature extractor layer to generate the second feature vectors.

23. The object recognizing apparatus of claim 21, wherein the first feature vectors are column vectors of feature vectors extracted by a feature extractor layer and the second feature vectors are row vectors of the feature vectors extracted by the feature extractor layer.

24. The object recognizing apparatus of claim 21, wherein the feature extractor is further configured to lighten the first pooled vector and lighten the second pooled vector and determine the third feature vector based on the lightened first pooled vector and the lightened second pooled vector.

25. The object recognizing apparatus of claim 22, wherein the feature extractor is further configured to generate the first pooled vector by performing the pooling operation with respect to each of the first feature vectors and a mask vector for passing an object corresponding to a target category.

26. The object recognizing apparatus of claim 25, wherein the feature extractor is further configured to obtain the first pooled vector by performing the pooling operation with respect to each of the first feature vectors and mask vectors for passing each target part of the object.

27. The object recognizing apparatus of claim 22, wherein the first feature vectors are column vectors and the second feature vectors are row vectors.

28. The object recognizing apparatus of claim 21, wherein the feature extractor is further configured to:
perform an additional feature extraction of the input image;
generate a third pooling vector by performing a pooling operation with respect to each of third feature vectors dependent on the performed additional feature extraction;
generate a fourth pooling vector by performing a pooling operation with respect to each of fourth second feature vectors dependent on the performed additional feature extraction; and
determine another third feature vector based on the third pooled vector and the fourth pooled vector, and
wherein the classifier is configured to identify the object in the input image based on the third feature vector and the other third feature vector.

29. The method of claim 6, further comprising:
applying the input image to an object separator;
obtaining a mask image indicating a category of at least one object included in the input image; and
obtaining the mask vector based on the mask image and a size of each of the first pooled feature vectors.

30. The method of claim 1, wherein the determining of the third feature vector comprises:

determining column vectors and row vectors based on corresponding points having a substantially identical offset in the first feature vectors;
obtaining a plurality of vectors based on respective products of the column vectors and the row vectors;
determining a feature vector associated with the first layer based on the obtained plurality of vectors; and
determining the third feature vector based on the feature vector associated with the first layer.

* * * * *